US012108266B2

(12) United States Patent
Douglas et al.

(10) Patent No.: US 12,108,266 B2
(45) Date of Patent: Oct. 1, 2024

(54) WIRELESS MESH NETWORK HEALTH DETERMINATION

(71) Applicant: DIGITAL LUMENS INCORPORATED, Boston, MA (US)

(72) Inventors: Bruce A. C. Douglas, Fayetteville, GA (US); Stefan Warner, Keswick (CA); David Ko, Scarborough (CA)

(73) Assignee: DIGITAL LUMENS INCORPORATED, Boston, MA (US)

(*) Notice: Subject to any disclaimer, the term of this patent is extended or adjusted under 35 U.S.C. 154(b) by 0 days.

(21) Appl. No.: 17/499,375

(22) Filed: Oct. 12, 2021

(65) Prior Publication Data
US 2022/0030452 A1    Jan. 27, 2022

Related U.S. Application Data

(63) Continuation of application No. 16/541,445, filed on Aug. 15, 2019, now abandoned, which is a
(Continued)

(51) Int. Cl.
| | |
|---|---|
| *H04W 24/08* | (2009.01) |
| *H04L 41/12* | (2022.01) |
| *H04L 41/142* | (2022.01) |
| *H04L 43/0823* | (2022.01) |
| *H04W 84/18* | (2009.01) |

(52) U.S. Cl.
CPC ............. *H04W 24/08* (2013.01); *H04L 41/12* (2013.01); *H04L 41/142* (2013.01);
(Continued)

(58) Field of Classification Search
CPC ... H04L 41/12; H04L 41/142; H04L 43/0847; H04W 24/08; H04W 84/18; Y02D 30/70
See application file for complete search history.

(56) References Cited

U.S. PATENT DOCUMENTS

| | | |
|---|---|---|
| 2006/0227751 A1 | 10/2006 | Theobold et al. |
| 2011/0110230 A1 | 5/2011 | Zhuang |
| | (Continued) | |

OTHER PUBLICATIONS

Non-Final Rejection received in corresponding U.S. Appl. No. 15/058,218, dated Nov. 13, 2017.
(Continued)

*Primary Examiner* — Mansour Oveissi
(74) *Attorney, Agent, or Firm* — McDermott Will & Emery LLP

(57) ABSTRACT

Methods and system to determine the health of wireless mesh networks are provided. Each radio node of a wireless mesh network transmits Link Quantification Messages (LQMs) interPAN at maximum power to enable adjacent nodes to determine the Received Signal Strength Indication (RSSI) on the wireless link to that radio node. Each radio node also transmits LQMs at successively lower power levels. The adjacent nodes detect a power level at measurable packet error rate to determine a noise floor for the wireless link. An aggregator collects link quantification information from the radio nodes and forms an intercommunication matrix for the wireless network. The RSSI and power level at measurable packet error rate information is used to remove unreliable links from the intercommunication matrix. Nodes are ranked and the reliability and dependability of the nodes is calculated to show the network health.

9 Claims, 6 Drawing Sheets

Related U.S. Application Data continuation of application No. 15/058,218, filed on Mar. 2, 2016, now Pat. No. 10,390,241.

(60) Provisional application No. 62/232,773, filed on Sep. 25, 2015.

(52) U.S. Cl.
CPC ......... *H04L 43/0847* (2013.01); *H04W 84/18* (2013.01); *Y02D 30/70* (2020.08)

(56) References Cited

U.S. PATENT DOCUMENTS

| | | | |
|---|---|---|---|
| 2013/0258950 | A1 | 10/2013 | Behroozi et al. |
| 2014/0036715 | A1 | 2/2014 | Chung et al. |
| 2015/0117247 | A1* | 4/2015 | Wang .................... H04W 76/14 370/252 |
| 2015/0139010 | A1* | 5/2015 | Jeong .................... H04W 48/20 370/252 |
| 2016/0345335 | A1 | 11/2016 | Gallien |

OTHER PUBLICATIONS

Non-Final Rejection received in corresponding U.S. Appl. No. 16/541,445, dated Jul. 31, 2020.

Final Rejection received in corresponding U.S. Appl. No. 16/541,445, dated Apr. 9, 2021.

Examiner's Report received in corresponding Canadian Patent Application No. 2922460, dated Jan. 3, 2023.

\* cited by examiner

WIRELESS MESH NETWORK HEALTH DETERMINATION

CROSS-REFERENCE TO RELATED APPLICATIONS

The present application is a continuation of U.S. patent application Ser. No. 16/541,445, filed on Aug. 15, 2019, which is a continuation of U.S. patent application Ser. No. 15/058,218, filed on Mar. 2, 2016, now U.S. Pat. No. 10,390,241, issued on Aug. 20, 2019 entitled "WIRELESS MESH NETWORK HEALTH DETERMINATION," which claims the benefit of, and priority to, U.S. Provisional Application No. 62/232,773, entitled "NETWORK HEALTH DETERMINATION," filed on Sep. 25, 2015, the entire contents of each being incorporated by reference.

TECHNICAL FIELD

The present invention relates to networks, and more specifically, to determining the health of a localized wireless mesh network having a large number of wirelessly connected network devices.

BACKGROUND

A wireless mesh network is a communication network made up of radio nodes organized in a mesh topography. Wireless mesh networks often include wireless mesh clients, which are end point devices, wireless mesh routers (referred to throughout as "radio nodes"), and gateways that interconnect the wireless mesh networks with external networks. The radio nodes use a routing strategy to relay radio frequency (RF) messages from wireless mesh clients through the wireless mesh network to their final destination, which may be another wireless mesh client, one of the radio nodes on the wireless mesh network, or the gateway.

SUMMARY

A wireless mesh network is typically quite reliable, in that there are potential multiple redundant paths of the meshing links. However, each wireless mesh network is unique and time varying, and the level of redundancy and reliability depends on the RF topography and the quality of the meshing links. Each RF link between a pair of adjacent radio nodes in the wireless mesh network may be considered a separate channel with its own unique signal and noise characteristics that vary over time. For example, a link may be degraded by increased attenuation due to insertion of a new obstacle into the environment, which may cause increased noise due to signal diffraction and signal reflections. Likewise, a link in the wireless mesh network may experience ephemeral noise, such as from a leaky microwave oven or other source of interference to the RF signals being used to transmit information between the radio nodes.

Embodiments are based, at least in part, on the realization that it would be advantageous to provide a network health determination process to enable the health of a wireless mesh network to be determined prior to failure on the wireless mesh network. In some embodiments, each radio node of a wireless mesh network transmits Link Quantification Messages (LQMs) interPAN at maximum power to enable adjacent nodes to determine received signal strength indication (RSSI) on the wireless link to that radio node. Each radio node also transmits LQMs at successively lower power levels. The adjacent nodes detect a power level at a measurable packet error rate to determine a noise floor for the wireless link. An aggregator collects link quantification information from the radio nodes and forms an intercommunication matrix for the wireless network. The RSSI and power level at measurable packet error rate information is used to remove unreliable links from the intercommunication matrix. Nodes are ranked, and the reliability and dependability of the nodes is calculated to show the network health.

In an embodiment, there is provided a method. The method includes: receiving, by a receiving radio node in a wireless mesh network, a first set of link quantification messages that were transmitted at a maximum transmit power level by a transmitting radio node in the wireless mesh network; receiving, by the receiving radio node in the wireless mesh network, at least portions of a subsequent sets of link quantification messages that were transmitted at lower power levels below the maximum transmit power level by the transmitting radio node in the wireless mesh network; detecting, by the receiving radio node from the subsequent sets of link quantification messages, one of the lower power levels at which the receiving radio node experiences measurable packet error rate; and storing the power level at which the receiving radio node experiences measurable packet error rate as an indication of noise on a link between the receiving node and the transmitting node.

In a related embodiment, receiving may include receiving subsequent sets of link quantification messages in which each subsequent set of link quantification messages was transmitted at a unique discrete lower power level. In another related embodiment, storing the power level at which the receiving radio node experiences measurable packet error rate may include storing the power level at which the receiving radio node experiences measurable packet error rate as an indication of transient noise on the link between the receiving node and the transmitting node.

In yet another related embodiment, the method may further include calculating an approximation of a signal to noise ratio for the link between the receiving node and the transmitting node using the maximum transmit power level and the power level at which the receiving radio node experiences measurable packet error rate. In still another related embodiment, the method may further include: determining, from the first set of link quantification messages, a received signal strength indication for the link between the receiving node and the transmitting node to quantify a noise level for the link between the receiving node and the transmitting node. In a further related embodiment, determining the received signal strength indication may include: calculating individual received signal strength indications for each of the messages of the first set of link quantification messages; and determining an average received signal strength indication from the calculated individual received signal strength indications.

In another further related embodiment, the method may further include transmitting link quantification information to an aggregator, the link quantification information comprising a node identifier of the transmitting radio node, a node identifier of the receiving radio node, the determined received signal strength indication for the link between the receiving node and the transmitting node, and the lower power level at which the receiving radio node experiences measurable packet error rate for the link between the receiving node and the transmitting node.

In yet still another related embodiment, detecting one of the lower power levels at which the receiving radio node experiences measurable packet error rate may include: determining, by the receiving radio node, that one or more link quantification messages of one of the sets of link quantification messages was not received; and associating a transmit power level of the one of the sets of link quantification messages as the lower power level at which the receiving radio node experiences measurable packet error rate. In still yet another related embodiment, the method may further include: receiving, by the receiving radio node, proximity check messages from endpoint devices; and storing endpoint device identifiers. In a further related embodiment, the method may further include transmitting the endpoint device identifiers to an aggregator.

In an embodiment, there is provided a method of determining a health of a wireless mesh network. The method includes: aggregating link quantification information from a plurality of radio nodes implementing the wireless mesh network, the link quantification information from each radio node including radio node identifiers of adjacent radio nodes, received signal strength indication for links between the radio node and the adjacent radio nodes, and transmit power at measurable packet error rate on the links between the radio node and the adjacent radio nodes; forming an intercommunication matrix from the aggregated link quantification information, the intercommunication matrix excluding links with received signal strength indication below a threshold and excluding links in which the transmit power at measurable packet error rate is above a threshold; and ranking each of the nodes in the intercommunication matrix.

In a related embodiment, aggregating link quantification information may include aggregating received signal strength indication for links between the radio node and the adjacent radio nodes calculated based on transmissions from the adjacent radio nodes when the adjacent radio nodes are transmitting link quantification messages at maximum transmit power. In another related embodiment, ranking may include determining a lowest number of reliable hops on the wireless mesh network to a concentrator gateway on the wireless mesh network. In still another related embodiment, the method may further include determining a reliability of each node in the intercommunication matrix. In a further related embodiment, determining the reliability of each node may include determining a number of edges between the node and nodes of lower rank.

In yet another related embodiment, the method may further include determining a dependability of each node in the intercommunication matrix. In a further related embodiment, determining the dependability may include determining a number of edges between the node and nodes of higher rank.

In still yet another related embodiment, the method may further include: determining a reliability of each node in the intercommunication matrix by determining a number of edges between the node and nodes of lower rank; determining a dependability of each node in the intercommunication matrix by determining a number of edges between the node and nodes of higher rank; and identifying nodes having a higher dependability than reliability.

In yet still another related embodiment, the method may further include aggregating edge device identification information from the plurality of radio nodes implementing the wireless mesh network, the edge device identification information from each radio node including edge device identifiers of edge devices in periodic communication with the respective radio nodes.

In another embodiment, there is provided a computer program product, stored on a non-transitory computer readable medium, including instructions that, when executed on a processor of a radio node in a wireless mesh network, where the processor is in communication with the non-transitory computer readable medium, cause the processor to perform operations of: receiving, by a receiving radio node in the wireless mesh network, a first set of link quantification messages that were transmitted at a maximum transmit power level by a transmitting radio node in the wireless mesh network; receiving, by the receiving radio node in the wireless mesh network, at least portions of a subsequent sets of link quantification messages that were transmitted at lower power levels below the maximum transmit power level by the transmitting radio node in the wireless mesh network; detecting, by the receiving radio node from the subsequent sets of link quantification messages, one of the lower power levels at which the receiving radio node experiences measurable packet error rate; and storing the power level at which the receiving radio node experiences measurable packet error rate as an indication of noise on a link between the receiving node and the transmitting node.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
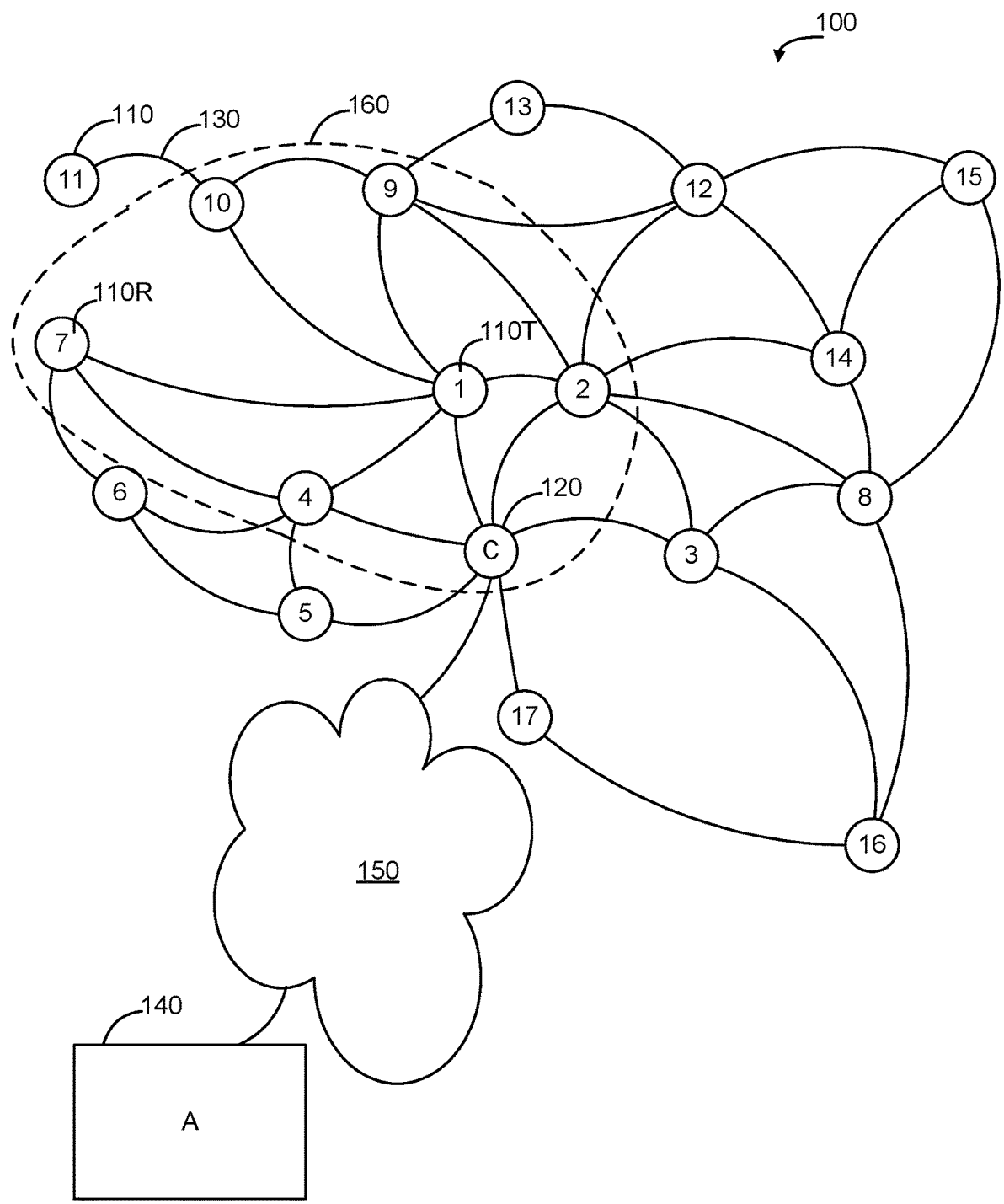
FIG. 1 shows a block diagram of a wireless mesh network according to embodiments disclosed herein.

FIG. 1 shows a wireless mesh network 100. As shown in FIG. 1, the wireless mesh network 100 includes radio nodes 110, which are labeled with the numbers 1-17 in FIG. 1. The radio nodes 110 are wirelessly connected to each other and to a concentrator gateway 120, which is labeled C in FIG. 1. The radio nodes 110 that are able to wirelessly communicate with each other are shown in the wireless mesh network 100 as being interconnected by links 130. An aggregator 140 is connected to the wireless mesh network 100 either directly or via a network 150. In some embodiments, the aggregator 140 is connected via a wireless connection, and in some embodiments, via a wired connection. The links 130 may be, and in some embodiments are, implemented using a wireless communication protocol, such as but not limited to IEEE 802.15.4. IEEE 802.15.4 is a standard which specifies the physical layer and media access control for low-rate wireless personal area networks (PANs). IEEE 802.15.4 is the basis for several other specifications, such as the ZigBee specification, which further extends the standard by developing the upper layers which are not defined in IEEE 802.15.4. Other higher layer protocols may likewise be used to specify the higher layers (layers 2-7) of the protocol stack.

In the wireless mesh network 100 of FIG. 1, the radio nodes 110 implement a routing protocol to coordinate forwarding of messages across the wireless mesh network 100. The routing protocol in use on the wireless mesh network 100 enables messages to be transmitted across the wireless mesh network 100. There are more than fifty routing protocols that have been proposed for routing messages across wireless mesh networks, such as the wireless mesh network 100 of FIG. 1. Since the concepts described herein are independent of the routing protocol and operate outside of the protocol stack, further description of the routing aspects will be omitted for brevity. When a message is transmitted on one of the links 130 on the wireless mesh network 100, receipt of the message is acknowledged to ensure the message is delivered across the link 130. Thus, as a message propagates through the wireless mesh network 100, it is passed from one of the radio nodes 110 to another of the radio nodes 110, where the transmission across each link 130 between the pair of radio nodes 110 is acknowledged by the recipient. If a radio node 110 does not receive an acknowledgment message, the radio node 110 will presume that the message was not received by the neighbor radio node 110 and will retransmit the message. When one of the radio nodes 110 does not receive confirmation of receipt of its transmission across one of the links 130 after multiple retries, it will broadcast a failure notification throughout the wireless mesh network 100. The message originator may then initiate a route discovery to the destination in order to find an alternate path through the wireless mesh network 100. The process of retransmitting the message, computing a new route for the message through the wireless mesh network 100, and sending the message on the new path through the wireless mesh network 100 takes time and consumes bandwidth on the wireless mesh network 100. Additionally, an alternative path may not always exist.

Accordingly, it would be preferable to determine the health of the wireless mesh network 100 before a failure occurs or before the link conditions degrade to the point where transmission of messages on the wireless mesh network 100 is impaired. Embodiments define an automated process whereby the health and reliability of the wireless mesh network 100 are estimated before a failure occurs. The process uses distributed evaluation of the links 130 of each radio node 110, using both signal strength and noise estimates, to implement a link quantification process. The link quantification information is collected and used to implement a network health determination process.

Figure 2:
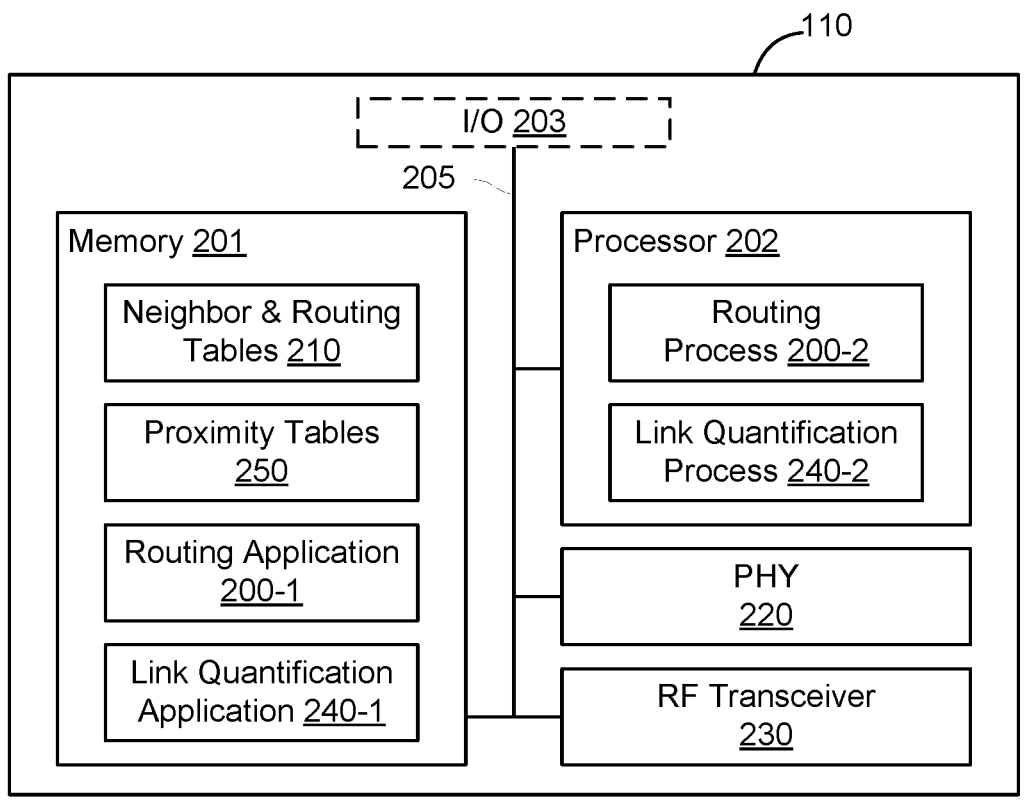
FIG. 2 is a functional block diagram of a radio node according to embodiments disclosed herein.

FIG. 2 shows a block diagram of a radio node 110, which in some embodiments is one of the radio nodes 110 in the wireless mesh network 100 of FIG. 1. FIG. 2 illustrates an example architecture of a radio node 110 that executes, runs, interprets, operates, or otherwise performs a routing application 200-1 and a routing process 200-2, and a link qualification application 240-1 and a link qualification process 204-2, suitable for use in explaining example configurations disclosed herein. As shown in FIG. 2, the radio node 110 includes an interconnection mechanism 205, such as but not limited to a data bus or other circuitry that couples a memory 201, a processor 202, an optional input/output interface I/O 203, a PHY 220, and an RF transceiver 230, which functions as a communications interface. The RF transceiver 230 enables the radio node 110 to communicate with other devices (i.e., other radio nodes, an aggregator, etc.) on a network, such as but not limited to the wireless mesh network 100 shown in FIG. 1.

The memory 201 is any type of computer readable medium, and in this example, is encoded with a routing application 200-1 and a link qualification application 240-1, as well as other information, as explained herein. The routing application 200-1 and the link qualification application 240-1 may be embodied as software code such as data and/or logic instructions (e.g., code stored in the memory or on another computer readable medium such as a removable disk) that supports processing functionality according to different embodiments described herein. During operation of the radio node 110, the processor 202 accesses the memory 201 via the interconnection mechanism 205 in order to launch, run, execute, interpret, or otherwise perform the logic instructions of the routing application 200-1 and/or the link qualification application 240-1. Execution of the routing application 200-1 and/or the link qualification application 240-1 in this manner produces processing functionality in the routing process 200-2 and/or the link qualification process 240-2. In other words, the routing process 200-2 represents one or more portions or runtime instances of a routing application 200-1 (or the entire routing application 200-1) performing or executing within or upon the processor 202 in the radio node 110 at runtime. Similarly, the link qualification process 240-2 represents one or more portions or runtime instances of a link qualification application 240-1 (or the entire link qualification application 240-1) performing or executing within or upon the processor 202 in the radio node 110 at runtime.

It is noted that example configurations disclosed herein include the routing application 200-1 itself and/or the link qualification application 240-1 itself (i.e., in the form of un-executed or non-performing logic instructions and/or data). The routing application 200-1 and/or the link qualification application 240-1 may be, and in some embodiments is/are, stored on a computer readable medium such as a disk, hard drive, electronic, magnetic, optical, or other computer readable medium. The routing application 200-1 and/or the link qualification application 240-1 may also be, and in some embodiments is/are, stored in a memory 201, such as in firmware, read only memory (ROM), or as executable code in, for example, Random Access Memory (RAM). In addition to these embodiments, it should also be noted that other embodiments herein include the execution of the routing application 200-1 in the processor 202 as the routing process 200-2, and/or the execution of the link qualification application 240-1 in the processor 202 as the link qualification process 240-2. Those skilled in the art will understand that the radio node 110 may, and in some embodiments does, include other processes and/or software and hardware components, such as an operating system that controls allocation and use of hardware resources associated with the radio node 110, not shown in this example.

As seen in FIG. 2, the radio node 110 also includes neighbor and routing tables 210 and proximity tables 250, stored in the memory 201. The PHY 220 manages the RF transceiver 230 and performs channel selection and energy and signal management functions. The RF transceiver 230, under the control of the PHY 220, transmits and receives RF signals on a wireless mesh network, such as but not limited to the wireless mesh network 100 of FIG. 1, to enable messages to be exchanged with other radio nodes on the wireless mesh network. The routing process 200-2 exchanges link status and routing messages with neighboring radio nodes 110. Information learned by the routing process 200-2 about the neighboring radio nodes 110 is stored in the neighbor and routing tables 210. The particular information exchanged by the routing processes 200-2 of the radio node 110 and the neighboring radio nodes 110 will depend on the routing protocol in use on the wireless mesh network. The routing process 200-2 of each radio node 110 therefore collects information about its neighboring radio nodes 110 in order to establish routes through the wireless mesh network. This routing information, which includes information about a subset of the radio nodes in its proximity along with their link quality and age, are stored in the neighbor and routing tables 210 maintained by the routing process 200-2 in the memory 201. These tables are built up from periodic link status and routing messages that the radio nodes 110 transmit on the wireless mesh network.

While the neighbor and routing tables 210 provide a ready source of link quality information, this information is tightly coupled with the communication stack, which limits its general usage. For example, due to resource limitations, the neighbor and routing tables 210 in some embodiments only have between eight and sixteen entries, where each entry remains quasi-static due to the dependency of the neighbor and routing tables 210 and the network join process. Thus, for example, the radio node 110 may not have information about one of the neighbor radio nodes 110 in its neighbor and routing tables 210, if the radio node 110 does not have a routing adjacency with that neighbor radio node. In a dense network having many radio nodes 110 located within radio communication of each other, one of the radio nodes 110 may have many more neighbor radio nodes 110 in its vicinity then are able to be accommodated in the neighbor and routing tables 210. Thus, the information contained in the neighbor and routing tables 210 may only provide a sparse subset of information related to neighboring radio nodes 110 and the links, such as the links 130 of FIG. 1, which may be used to transmit information in the wireless mesh network, such as the wireless mesh network 100 of FIG. 1.

Embodiments specify a method to generate distributed link quality information that incorporates the received signal strength indication (also referred to throughout as RSSI) as well as an estimate of the transient noise floor. The received signal strength indication provides an estimate of the link budget between the received energy and the radio received sensitivity, whereas the packet error rate will indicate where the noise floor and interference start affecting communication throughput. The combination of received signal strength indication and noise floor provides a good estimate of the link reliability. Embodiments also specify how the link quality information, once aggregated, is evaluated to determine the network health.

As shown in FIG. 2, the radio node 110 also includes the link quantification process 240-2 and the proximity table 250. The link quantification process 240-2 instructs the PHY 220 to transmit link quantification messages, which are used to determine both the received signal strength indication and to evaluate the noise floor of the links 130 shown in FIG. 1, for example between a transmitting radio node 110T and a neighboring radio node that receives a link quantification messages 110R. The link quantification messages are sent as interPAN messages, or messages external to the current network, which limit the stack handling of the data. The process of transmitting link quantification messages is described in greater detail below in connection with FIG. 3.

The link quantification process 240-2 also listens for link quantification messages from other radio nodes 110 on the wireless mesh network 100 of FIG. 1 and uses the received link quantification messages to update entries in its proximity table 250. The process of receiving link quantification messages and updating entries in the proximity table 250 is described in greater detail below in connection with FIG. 4. Use of the proximity table 250, which is separate and independent of the neighbor and routing tables 210, decouples link quantification from the protocol stack in use on the radio nodes 110, so that link quantification is not limited to the set of nodes contained in the neighbor and routing tables 210. This also enables the link quantification process 240-2 to cycle new radio nodes through the proximity table 250 without impacting network routing.

Embodiments include the methods described throughout as software or firmware in each of the radio nodes 110 that determines the link quality at the respective radio node 110 and includes the process used by the aggregator to determine the network health, such as network redundancy. Each radio node 110 within the wireless mesh network 100 will maintain its proximity table 250 that often will include more entries than are contained in the neighbor and routing tables 210 of the radio node 110. Each entry in the proximity table 250 will include at least the radio node ID of a neighboring radio, a received signal strength indication at max transmit power characterizing the link 130 to the neighboring radio node, a transmit power level at measureable packet error rate characterizing the noise on the link 130, and the age of the entry.

During link quantification, a transmitting radio node 110T will transmit link quantification messages and each of the radio nodes that are able to receive the link quantification messages, given the transmission characteristics of the wireless mesh network 100, will collect link quantification information from the transmitted link quantification messages. The radio nodes 110 that receive link quantification messages will be referred to as receiving radio nodes 110R. FIG. 1 shows an example in which node 1 is a transmitting radio node 110T and nodes C, 2, 4, 7, 9, and 10 are receiving radio nodes 110R. A dashed line 160 shows the effective physical communication distance of RF transmission of link quantification messages at full power. Nodes outside the dashed line 160 may, and in some embodiments do, receive communications from node 1 when node 1 is transmitting at full power, however the link quality may be lower than a threshold and subsequently dropped from the analysis. Each radio node 110 will individually assume the role of transmitting radio node 110T and each radio node 110 within physical communication distance of the transmitting radio node 110T will assume the role of receiving radio node 110R for the duration of the transmitting radio node's link quantification process.

Figure 3:
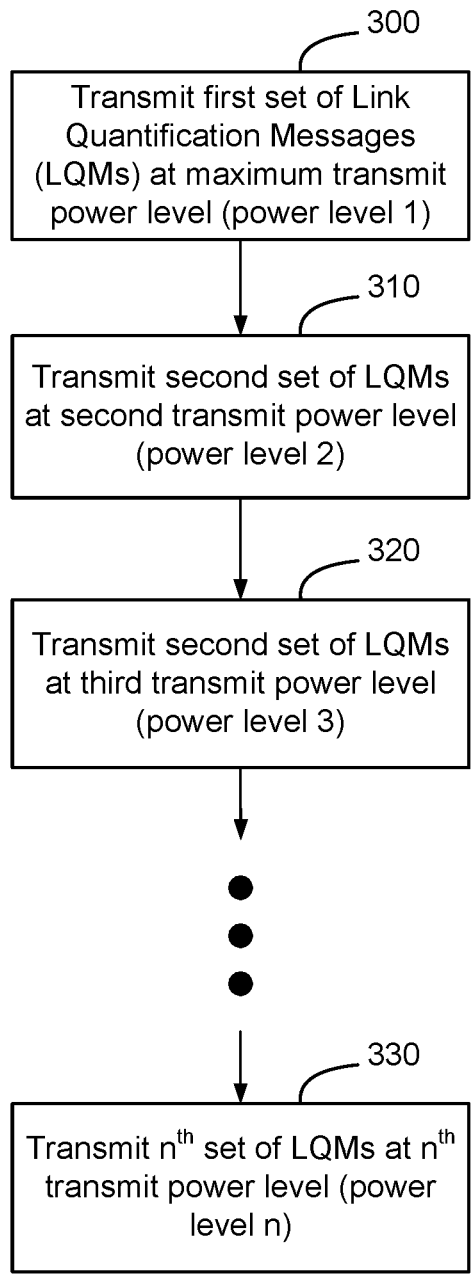
FIGS. 3 and 4 are flow diagrams of link health quantification processes implemented by the radio nodes of a wireless mesh network according to embodiments disclosed herein.
Figure 4:
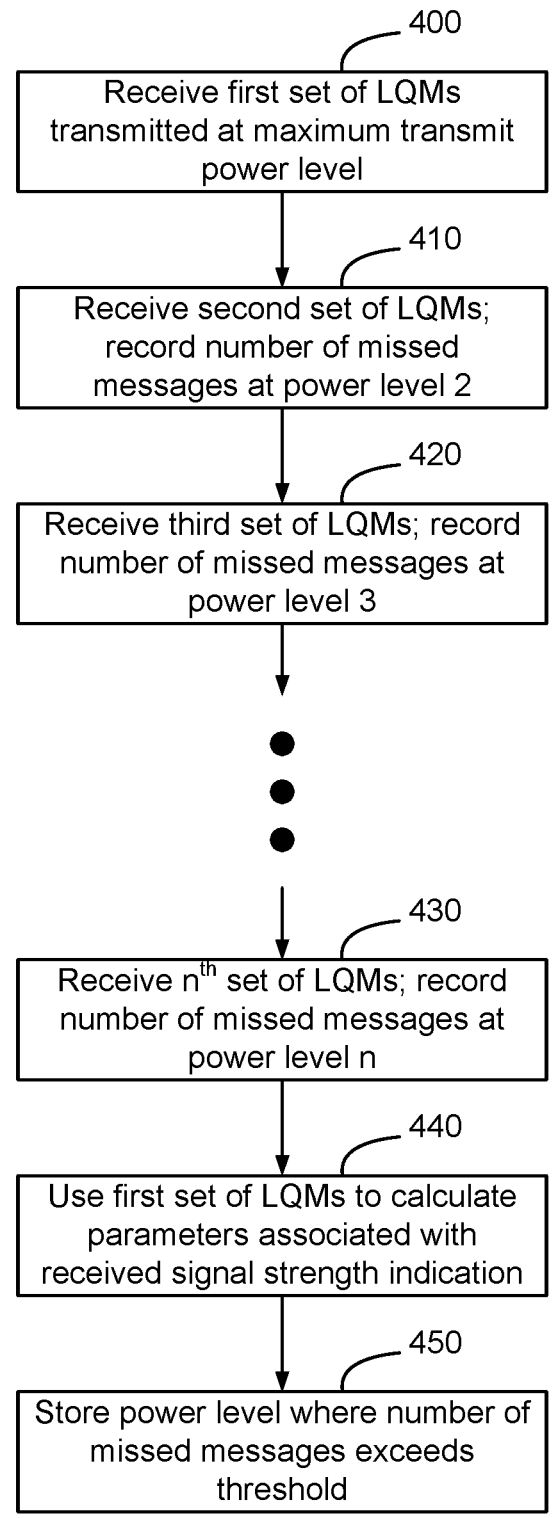
Figure 6:
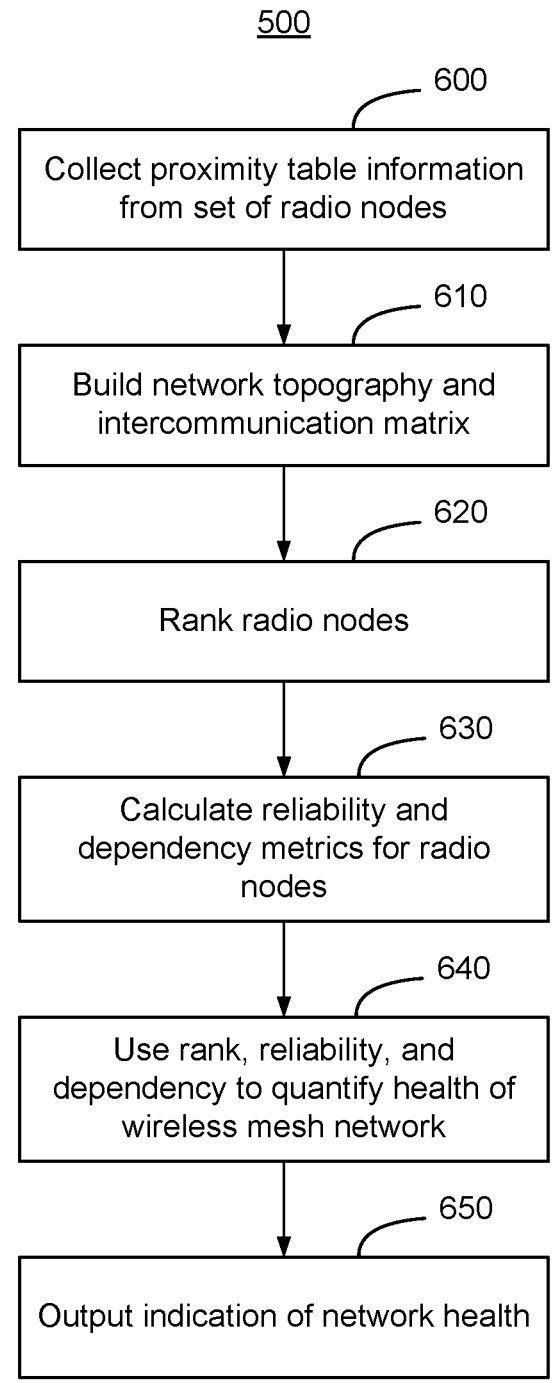
FIG. 6 is a flow diagram of a network health determination process implemented by the aggregator of FIG. 5 according to embodiments disclosed herein.

Flow diagrams of various methods are respectively depicted in FIGS. 3, 4, and 6. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Further, while FIGS. 3, 4, and 6 each illustrates various operations, it is to be understood that not all of the operations depicted in FIGS. 3, 4, and 6 are necessary for other embodiments to function. Indeed, it is fully contemplated herein that in other embodiments of the present disclosure, the operations depicted in FIGS. 3, 4, and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

FIG. 3 shows a method of transmitting a series of link quantification messages to enable the noise floor on links associated with the transmitting radio node 110T to be sensed by receiving radio nodes 110R. Thus, the method of FIG. 3 is, in some embodiments, the link quantification process 240-2 of FIG. 2, and is alternatively referred to as such. As shown in FIG. 3, during the link quantification process 240-2, the transmitting radio node 110T issues a defined number of link quantification messages in a predetermined pattern, which are detected by receiving radio nodes 110R and used by the receiving radio nodes 110R to update their proximity tables 250. In some embodiments, the link quantification messages are always of the same length. In some embodiments, the message length of the link quantification messages transmitted between the radio nodes 110 is sixty-four bytes. In some embodiments, link quantification messages having a message length other than sixty-four bytes are used. The format of the messages, e.g., which bytes are used to carry information about the node ID, the sequence number, the power level, and the other message content fields described herein, depends on the implementation.

In some embodiments, as shown in FIG. 3, the transmitting radio node 110T will transmit a first set of link quantification messages at a first power, power level 1, 300. In FIG. 3, the power level 1 is a maximum transmit power level. For example, the first set of link quantification messages include, in some embodiments, a set number of link quantification messages, e.g. twenty to two hundred messages, periodically transmitted at full transmit power, e.g., every five hundred to fifteen hundred milliseconds. Each link quantification message includes the transmitting node ID, a sequence number, and an indication of the power level used by the transmitting radio node 110T to transmit the message. The link quantification messages may also include an indication of the number of link quantification messages that will be transmitted by the transmitting node 110T at the current power level. Other fields may be, and in some embodiments are, included in the link quantification messages as well, for example to enable additional information to be exchanged between the radio nodes 110. In some embodiments, the link quantification messages are sent as interPAN messages, which are not addressed and are not routed/forwarded by receiving radio nodes 110R on the wireless mesh network 100. In some embodiments, the link quantification messages are transmitted at the physical layer and detected by any receiving radio nodes 110R within physical communication distance of the transmitting radio node 110T. The link quantification messages have no relevance to the radio nodes 110 above the physical layer, e.g. at higher layers of the seven layer network stack, and, hence are not processed by the protocol stacks of the receiving radio nodes 110R.

The transmitting radio node 110T will also transmit a second set of link quantification messages at a second transmit power level, power level 2, 310. In some embodiments, the transmit power level used to transmit the second set of link quantification messages (i.e., power level 2) is lower than the maximum transmit power level used to transmit the first set of link quantification messages (i.e., power level 1). The link quantification messages in the second set includes the transmitting radio node ID, a reset sequence number, an indication of the number of messages in the second set, and updated power setting information. The transmitting radio node 110T, in some embodiments, will also transmit a third set of link quantification messages at a third transmit power level, power level 3, 320. The link quantification messages in the third set include the transmitting radio node ID, a reset sequence number, an indication of the number of messages in the third set, and updated power setting information. This process iterates at successively lower transmit power levels until the transmitting radio node 110T has transmitted a final set of link quantification messages, where the transmit power level of the final set of link quantification messages is reduced significantly from the maximum transmit power level (i.e., power level 1), 330.

FIG. 4 shows a process of receiving the transmitted series of link quantification messages by receiving radio nodes 110R to quantify the link 130 from the transmit radio node 110T to the receiving radio node 110R. Specifically, the process shown in FIG. 4 enables the receiving radio nodes 110R to determine the average received signal strength indication of the link 130 at the maximum transmit power level, and to determine the transmit power level where the packet error rate on the link 130 exceeds a threshold. As shown in FIG. 4, during the link quantification process, each receiving radio node 110R will receive the first set of link quantification messages that were transmitted by the transmitting radio node 110T at the maximum transmit power level, 400. The receiving radio node 110R will detect power levels associated with this received first set of link quantification messages and calculate parameters associated with a received signal strength indication for the link 130 to the transmitting radio node 110T, 440. The receiving radio node 110R may, and in some embodiments do, calculate the parameters associated with the received signal strength indication coincident with receiving the first set of link quantification messages or may, and in some embodiments do, perform the calculation at a later point in time, e.g. after receipt of all link quantification messages of the first set of link quantification messages. In some embodiments, the receiving radio nodes 110R calculate the average received signal strength indication for the set of messages transmitted at the maximum power level and store this average received signal strength indication as a component of the link quantification information for the link 130. Each receiving radio node 110R also knows how many link quantification messages the transmitting radio node 110T will transmit during the link quantification process at each successive power level. In some embodiments, the number of link quantification messages to be transmitted by the transmitting radio node 110T is specified in the link quantification messages transmitted by the transmitting radio node 110T. In some embodiments, the number of link quantification messages to be transmitted by the transmitting radio node 110T is set in advance. For example, in some embodiments, both the transmitting radio node 110T and the receiving radio node 110R will know in advance that each set of messages will include a predefined specified number of link quantification messages. Accordingly, each receiving radio node 110R will listen for receipt of an expected number of link quantification messages at the transmit power level 2, 410, at transmit power level 3, 420, and at successive lower transmit power levels up to the final expected transmit power level, 430. Since each receiving radio node 110R knows how many link quantification messages are expected at each transmit power level, each receiving radio node 110R compares the number of link quantification messages expected at each transmit power level with the number of link quantification messages received at each power level to determine a packet error rate at each transmit power level. In some embodiments, the link quantification sequence numbers enable the receiving radio node 110R to determine whether one or more link quantification messages have not been received at a particular transmit power level.

In some embodiments, the receiving radio nodes implement a timeout process to cause the link quantification process at the receiving radio node to terminate after a predetermined period of time. In some embodiments, the predetermined period of time corresponds with an approximation of how long it will take a transmitting radio node 110T to complete transmission of the sets of link quantification messages at all transmit power levels. Each receiving radio node 110R that receives the link quantification messages from the transmitting radio node 110T updates an entry in its proximity table 250 for the corresponding transmitting radio node ID. Each receiving radio node 110R counts the number of link quantification messages that it receives from the transmitting radio node 110T at each power level. Each receiving radio node 110R also looks for link quantification messages that were not received, and when the packet error rate exceeds a threshold, the transmit power level associated with the link quantification messages that exhibited a measurable packet error rate is stored and used as an estimate of the noise floor for the link 130 between the transmitting radio node 110T and the receiving radio node 110R.

The receiving radio node 110R knows how many link quantification messages the transmitting radio node 110T will transmit at each power level, as discussed above, and therefore knows how many messages should be received. This expected number of link quantification messages is compared with the actual number of received link quantification messages to determine if any link quantification messages did not arrive. This enables the receiving radio node 110R to estimate the Packet Error Rate (PER) as: (the number of expected link quantification messages (Tx) minus the number of received link quantification messages (Rx)), divided by the number of expected link quantification messages (Tx), expressed as a percentage. Formulaically, this is expressed as:

$$PER=(Tx-Rx)/Tx [\%]$$

The proximity table entry for the transmitting radio node 110T is updated at the receiving radio node 110T to include the transmit power level at measurable packet error rate, i.e. where the number of missed link quantification messages results in a packet error rate above the threshold. In some embodiments, the packet error rate threshold is one missed message, and in some embodiments the packet error rate threshold is a number of missed messages in excess of one percent (PER>1%).

The average received signal strength indication at maximum transmit power provides an estimate of the channel attenuation, which is influenced by the distance between the radio nodes 110, attenuating obstacles, and multipath interference, among other things. This value generally remains consistent if the physical environment in which the wireless mesh network 100 is deployed remains static. The transmit power level at which the packet error rate is measurable estimates the transient noise floor where interference and other radio frequency energy sources have an impact the reliability of the link 130. The difference between the maximum transmit power (Pmax) and the power level at measurable packet error rate (Ploss) provides an approximation of the signal to noise ratio on the link 130:

$$SNR=Pmax-Ploss$$

The average Received Signal Strength Indication (RSSI) detected at maximum transmit power level provides an approximation of an absolute value of the noise level on the link 130.

The entries stored in the proximity table 250 will be referred to herein as link quantification information. As noted above, in some embodiments the link quantification information for each proximity table entry includes: a node ID, RSSI, Ploss, and age. In other embodiments, the link quantification information for each proximity table entry includes: a node ID, SNR, and age. The age of each valid entry in the proximity table is incremented periodically, and it is reset whenever the receiving radio node 110R detects that the transmitting radio node 110T is performing the link quantification process.

Although FIGS. 3 and 4 show embodiments in which sets of link quantification messages are transmitted at decreasing power levels, other embodiments may and do use other transmission patterns of link quantification messages. For example, during the link quantification process, the transmitting radio node 110T in some embodiments transmits link quantification messages initially at a low power level and then increases the transmit power in connection with transmission of successive sets of link quantification messages, such that transmission of the last set of link quantification messages occurs at the maximum transmit power level. Likewise, while the embodiments shown in FIG. 3 describe an example power level sequence, other power level sequences may be and are used as well, as long as the receiving radio nodes 110R know how many link quantification messages will be transmitted at each power level, and what transmit power levels will be used. By knowing how many link quantification messages will be transmitted, and the power levels of the messages that will be transmitted, the receiving radio nodes 110R are able to detect non-receipt of a link quantification message and correlate the non-receipt of a link quantification message with an expected transmit power level for message that was not received.

Accordingly, some embodiments utilize different link quantification message transmit patterns. In connection with describing a few possible embodiments, the following nomenclature will be used:

LQMP1=link quantification message at maximum transmit power (level 1)

LQMP2=link quantification message at first reduced power (level 2)

LQMP3=link quantification message at second reduce power (level 3)

LQMP4=link quantification message at third reduced power (level 4)

LQMP5=link quantification message at fourth reduced power (level 5)

Although five power levels are described in these embodiments, in other embodiments different numbers of power levels are used. Likewise, although these embodiments will assume the transmission of twenty messages at each power level, other embodiments use other numbers of link quantification messages at each power level.

In some embodiments, link quantification is implemented by transmitting link quantification messages initially at the maximum power level and then at gradually reduced power levels. FIG. 3 shows an example of such embodiments. Using the nomenclature described above, this link quantification process may be described as:

Phase 1—transmit LQMP1 (messages 1-20) at max power level (level 1);

Phase 2—transmit LQMP2 (messages 1-20) at first reduced power (level 2);

Phase 3—transmit LQMP3 (messages 1-20) at second reduced power (level 3);

Phase 4—transmit LQMP4 (messages 1-20) at third reduced power (level 4);

Phase 5—transmit LQMP5 (messages 1-20) at fourth reduced power (level 5)

In some embodiments, link quantification is implemented by transmitting link quantification messages initially at a lower power and then at gradually increased power levels. Using the nomenclature described above, this link quantification process may be described as:

Phase 1—transmit LQMP5 (messages 1-20) at fourth reduced power (level 5);

Phase 2—transmit LQMP4 (messages 1-20) at third reduced power (level 4);

Phase 3—transmit LQMP3 (messages 1-20) at second reduced power (level 3);

Phase 4—transmit LQMP2 (messages 1-20) at first reduced power (level 2);

Phase 5—transmit LQMP1 (messages 1-20) at max power level (level 1)

In some embodiments, link quantification is implemented by transmitting link quantification messages at varying transmit power levels and cycling through the transmit power levels multiple times. Using the nomenclature described above, this link quantification process may be described as:

Phase 1—transmit LQMP1 (messages 1-10) at max power level (level 1);

Phase 2—transmit LQMP2 (messages 1-10) at first reduced power (level 2);

Phase 3—transmit LQMP3 (messages 1-10) at second reduced power (level 3);

Phase 4—transmit LQMP4 (messages 1-10) at third reduced power (level 4);

Phase 5—transmit LQMP5 (messages 1-10) at fourth reduced power (level 5)

Phase 6—transmit LQMP1 (messages 11-20) at max power level (level 1);

Phase 7—transmit LQMP2 (messages 11-20) at first reduced power (level 2);

Phase 8—transmit LQMP3 (messages 11-20) at second reduced power (level 3);

Phase 9—transmit LQMP4 (messages 11-20) at third reduced power (level 4);

Phase 10—transmit LQMP5 (messages 11-20) at fourth reduced power (level 5)

In some embodiments, link quantification is implemented by continuously varying the power level with successive transmissions of link quantification messages and cycling through the transmit power levels more than once. Using the nomenclature described above, this link quantification process may be described as:

Phase 1—transmit LQMP1 (message 1) at max power level (level 1);

Phase 2—transmit LQMP2 (message 1) at first reduced power (level 2);

Phase 3—transmit LQMP3 (message 1) at second reduced power (level 3);

Phase 4—transmit LQMP4 (message 1) at third reduced power (level 4);

Phase 5—transmit LQMP5 (message 1) at fourth reduced power (level 5)

Phase 6—transmit LQMP1 (message 2) at max power level (level 1);

Phase 7—transmit LQMP2 (message 2) at first reduced power (level 2);

Phase 8—transmit LQMP3 (message 2) at second reduced power (level 3);

Phase 9—transmit LQMP4 (message 2) at third reduced power (level 4);

Phase 10—transmit LQMP5 (message 2) at fourth reduced power (level 5)

Phase 96—transmit LQMP1 (message 20) at max power level (level 1);

Phase 97—transmit LQMP2 (message 20) at first reduced power (level 2);

Phase 98—transmit LQMP3 (message 20) at second reduced power (level 3);

Phase 99—transmit LQMP4 (message 20) at third reduced power (level 4);

Phase 100—transmit LQMP5 (message 20) at fourth reduced power (level 5)

In some embodiments, this sequence iterates until all messages have been transmitted at each of the power levels.

As is clear, there are multiple potential transmission patterns that may be used in connection with link quantification using link quantification messages with varying transmit power levels. Whichever transmission pattern is selected, the receiving radio nodes 110R need to know the selected transmission pattern so that the receiving radio nodes 110R may detect non-receipt of one or more of the link quantification messages and correlate the lack of receipt of the one or more of the link quantification messages with expected transmission power of those non-received link quantification messages. This enables the receiving radio nodes 110R to determine the transmit power level at measurable packet error rate to characterize the noise on the link 130. Each radio node 110 in the wireless mesh network 100 will therefore participate in the link quantification process in two ways: (1) as a transmitting radio node 110T, and (2) as a receiving radio node 110R. Each radio node 110 will periodically assume the role of transmitting radio node 110T and will transmit a series of link quantification messages as described above. Each radio node 110 will also periodically assume the role of receiving radio node 110R whenever the radio node 110 starts to receive link quantification messages from another radio node 110 on the wireless mesh network 100. Optionally, the transmitting radio node 110T may transmit an initial message to notify adjacent nodes that the transmitting radio node 110T is about to start the link quantification process.

Since transmission of link quantification messages will consume bandwidth on the wireless mesh network, in some embodiments an external evaluation of network traffic is implemented prior to initiation of the link quantification process to cause the link quantification process to occur during times of lower network traffic. In some embodiments, an aggregator will evaluate the current and estimated traffic load on the wireless mesh network 100 to determine when the radio nodes should perform link quantification and when the link quantification data should be retrieved to the aggregator. The proximity table 250 in each radio node 110 contains detailed information about links 130 from that radio node 110 to other radio nodes within physical communication distance of the radio node 110 within the mesh network 100. Since the messages are transmitted interPAN (not routed), the proximity table will contain link quantification information for all radio nodes 110 in the mesh network 100 that the radio node 110 is able to communicate with at the physical level regardless of the routing topography of the network. In some embodiments, link quantification information is retrieved from multiple radio nodes and processed to enable the health of the network to be determined. In some embodiments, the process of retrieving link quantification information from the radio nodes 110 and using the link quantification information to determine network health is performed by an aggregator.

Figure 5:
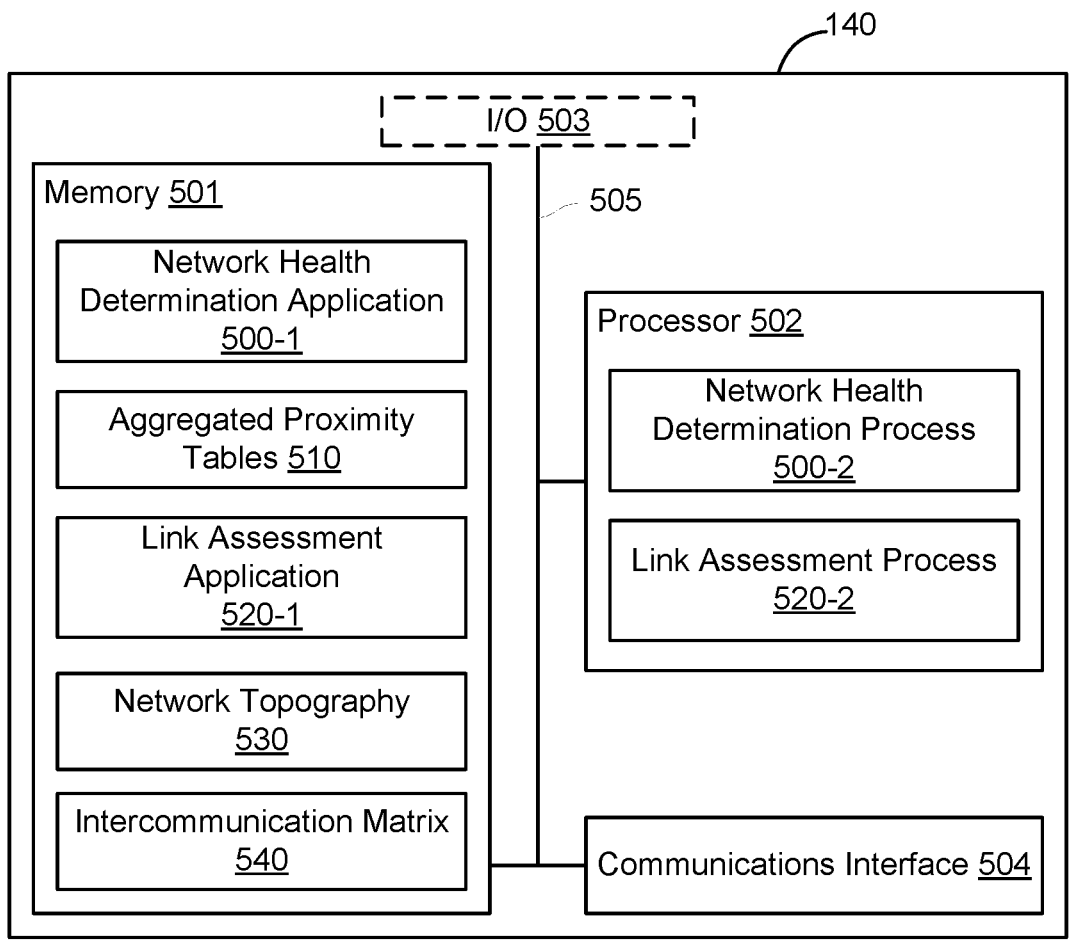
FIG. 5 is a functional block diagram of an aggregator associated with the network of FIG. 1 according to embodiments disclosed herein.

FIG. 5 shows a block diagram of an aggregator 140. FIG. 5 illustrates an example architecture of the aggregator 140 that executes, runs, interprets, operates, or otherwise performs a network health determination application 500-1 and a network health determination process 500-2, and a link assessment application 520-1 and a link assessment process 520-2, suitable for use in explaining example configurations disclosed herein. As shown in FIG. 5, the aggregator 140 includes an interconnection mechanism 505, such as but not limited to a data bus or other circuitry that couples a memory 501, a processor 502, an optional input/output interface I/O 503, and a communications interface 504. The communications interface 504 enables the aggregator 140 to communicate with other devices (i.e., other radio nodes, end devices, etc.) on a network, such as but not limited to the wireless mesh network 100 shown in FIG. 1.

The memory 501 is any type of computer readable medium, and in this example, is encoded with a network health determination application 500-1 and a link assessment application 520-1, as well as other information, as explained herein. The network health determination application 500-1 and the link assessment application 520-1 may be embodied as software code such as data and/or logic instructions (e.g., code stored in the memory or on another computer readable medium such as a removable disk) that supports processing functionality according to different embodiments described herein. During operation of the aggregator 140, the processor 502 accesses the memory 501 via the interconnection mechanism 505 in order to launch, run, execute, interpret, or otherwise perform the logic instructions of the network health determination application 500-1 and/or the link assessment application 520-1. Execution of the network health determination application 500-1 and/or the link assessment application 520-1 in this manner produces processing functionality in the network health determination process 500-2 and/or the link assessment process 520-2. In other words, the network health determination process 500-2 represents one or more portions or runtime instances of a network health determination application 500-1 (or the entire network health determination application 500-1) performing or executing within or upon the processor 502 in the aggregator 140 at runtime. Similarly, the link assessment process 520-2 represents one or more portions or runtime instances of a link assessment application 520-1 (or the entire link assessment application 520-1) performing or executing within or upon the processor 502 in the aggregator 140 at runtime.

It is noted that example configurations disclosed herein include the network health determination application 500-1 itself and/or the link assessment application 520-1 itself (i.e., in the form of un-executed or non-performing logic instructions and/or data). The network health determination application 500-1 and/or the link assessment application 520-1 may be, and in some embodiments is/are, stored on a computer readable medium such as a disk, hard drive, electronic, magnetic, optical, or other computer readable medium. The network health determination application 500-1 and/or the link assessment application 520-1 may also be, and in some embodiments is/are, stored in the memory 501, such as in firmware, read only memory (ROM), or as executable code in, for example, Random Access Memory (RAM). In addition to these embodiments, it should also be noted that other embodiments herein include the execution of the network health determination application 500-1 in the processor 502 as the network health determination process 500-2, and/or the execution of the link assessment application 520-1 in the processor 502 as the link assessment process 520-2. Those skilled in the art will understand that the aggregator 140 may, and in some embodiments does, include other processes and/or software and hardware components, such as an operating system that controls allocation and use of hardware resources associated with the aggregator 140, not shown in this example.

As shown in FIG. 5, the aggregator also includes aggregated proximity tables 510, network topography tables 530, and an intercommunication matrix 540, all stored in the memory 501. In FIG. 1, the aggregator 140 is shown as connected to the wireless mesh network via the network 150, though as described above in regards to FIG. 1, this is not necessary. The aggregator 140, in some embodiments, is implemented as one or more processes instantiated on a separate processor/computer/server external to the wireless mesh network 100 as shown in FIG. 1, and in some embodiments is implemented as one or more processes instantiated in the concentrator gateway 120, and in some embodiments is implemented as one or more processes instantiated in one of the radio nodes 110, or as one or more processes instantiated in an endpoint device connected to the wireless mesh network 100.

FIG. 6 shows a method implemented by the aggregator 140 according to some embodiments. As shown in FIG. 6, a network health determination process 500-2 collects link quantification information, 600, from a set of radio nodes 110. In some embodiments, the network health determination process 500-2 collects link qualification information from the proximity tables 250 of each of the radio nodes 110. In some embodiments, the link quantification information includes the radio node ID of the radio node 110 from which the proximity table information is obtained, and the entries of the proximity table 250 on that radio node quantifying the link metrics described above for the links between that radio node and its neighboring radio nodes. As link quantification information is collected from each of the radio nodes 110, the link quantification information is stored in the aggregated proximity tables 510. In some embodiments, as the link quantification information is obtained from the radio nodes 110, the radio nodes 110 delete the information from their proximity tables 250. The link quantification information may be, and in some embodiments is, collected using Simple Network Management Protocol or another protocol designed to extract data from the proximity tables 250 of the radio nodes 110.

The aggregator 140 uses the link quantification information to determine the topography of the wireless mesh network 100, 610. The network topography is stored in the network topography tables 530. Once the aggregator has amassed link quantification information from all the radio nodes 110 in the wireless mesh network 100, the network health determination process 500-2 is able to construct an N×N intercommunication matrix 540, where N is the number of radio nodes 110 in the network, and the entries are signal to noise ratio link quality indexes derived from the signal to noise ratio on the links 130. Since the link quantification information retrieved by the network health determination process 500-2 includes both the average received signal strength indication for each edge, and information about the power level at which the packet error rate exceeded a threshold reliability metric for the respective edge, the network health determination process 500-2 is able to determine the approximate absolute noise level on the link and to approximate the signal to noise ratio for each of the edges interconnecting the radio nodes 110. This information is included in the N×N intercommunication matrix. Edges with a noise level above a threshold and/or a signal to noise ratio below a predetermined threshold may be, and in some embodiments are, set to zero or otherwise determined to not be reliable and ignored when processing the network health. For example, in some embodiments the signal to noise ratio information in the intercommunication matrix is used in connection with ranking the radio nodes 110 by excluding edges that do not meet predetermined signal to noise threshold criteria. In some embodiments, the intercommunication matrix 540 is part of the network topography 530. In some embodiments, the intercommunication matrix 540 is separate from the network topography 530, as shown in FIG. 5.

The network health determination process 500-2 evaluates each of the radio nodes in the intercommunication matrix to assign ranks to the radio nodes, 620, calculates dependency and reliability metrics for the radio nodes 630, and uses the rank, reliability, and dependency metrics to quantify the health of the wireless mesh network 100, 640. Optionally, indications associated with the health of the wireless mesh network 100 in some embodiments are visualized as described in connection with FIG. 7.

The link assessment process 520-2 evaluates the radio nodes 110 of the intercommunication matrix 540 to assign ranks to the radio nodes. Each radio node 110 in the wireless mesh network 100 will be assigned a rank, which is defined as the number of reliable hops that the radio node 110 must travel to reach the concentrator gateway 120. In some embodiments, if the received signal strength indication indicates that the overall noise on a link is too high, or if the signal to noise ratio indicates that the link between two nodes is sufficiently weak, the edge will be excluded and not used to rank the radio nodes. The concentrator gateway 120 is rank 0 and the radio nodes 110 that communicate directly with the concentrator gateway 120 and at least one other radio node 110 that also communicates with the concentrator gateway 120 are rank 1. Radio nodes 110 that do not have an edge with the concentrator gateway 120 but communicate directly with at least two rank 1 radio nodes 110 are considered rank 2. Radio nodes 110 that have less than two edges to rank 0 and rank 1 radio nodes 110, but communicate with at least two rank 2 or lower ranking radio nodes 110, are considered rank 3 radio nodes. The ranking of the radio nodes is performed in this manner, where a radio node 110 of rank X must communicate with at least two radio nodes of a lower rank (X−1). Ranking continues until all the radio nodes 110 in the wireless mesh network 100 are evaluated. The number of edges that a ranked radio node 110 has with radio nodes 110 of a lower rank specifies its level of redundancy. A radio node 110 that is not ranked represents a single point of failure, since it has no redundancy. Once the rank of all eligible radio nodes has been determined, the network health determination process 500-2 evaluates each radio node 110 for its reliability and dependency. Reliability is defined as the number of edges that a radio node 110 has with lower rank radio nodes. In the case of rank 1 radio nodes, reliability is the number of edges that a radio node has with the concentrator gateway 120 and other rank 1 radio nodes. The reliability indicates how many orthogonal paths to the concentrator gateway 120 exist. The dependency is defined as the number of edges the radio node has with higher rank radio nodes. This metric indicates how many radio nodes depend on this particular radio node for its reliability.

The following table, Table 1, provides information about the rank, reliability, and dependency of the radio nodes 110 shown in the sample wireless mesh network 100 of FIG. 1.

TABLE 1

| Radio Node | Rank | Reliability | Dependency |
|---|---|---|---|
| 1 | 1 | 3 | 3 |
| 2 | 1 | 3 | 3 |
| 3 | 1 | 2 | 2 |
| 4 | 1 | 3 | 2 |
| 5 | 1 | 2 | 1 |
| 6 | 2 | 2 | 1 |
| 7 | 2 | 2 | 0 |
| 8 | 2 | 2 | 3 |
| 9 | 2 | 2 | 2 |
| 10 | 3 | 2 | 0 |
| 11 | N/A | 0 | 0 |
| 12 | 3 | 2 | 2 |
| 13 | 4 | 2 | 0 |
| 14 | 3 | 2 | 1 |
| 15 | 4 | 3 | 0 |
| 16 | 3 | 2 | 1 |
| 17 | 4 | 2 | 0 |
| C | 0 | N/A | N/A |

Ranking the radio nodes 110, evaluating radio node reliability, and radio node dependency, enables the overall health of the network to be quantified, 640. For example, radio nodes 110 with high dependency and low reliability may indicate areas of the mesh network 100 that present potential regions of failure that should be redesigned. Optionally, the network health may be output, 650, in visible, tangible, or any other format.

The manner in which the data provided by the network health determination process 500-2 is interpreted and actions taken in response to the network health determination may, and in some embodiments do, vary depending on the implementation. Example outputs from the network health determination process 500-2 may, and in some embodiments do, include graphical displays showing the network health and identifying regions of the wireless mesh network 100 that present potential points of failure. The radio nodes/links in such embodiments may be, and in some embodiments are, color coded to visually depict the health of the various components of the network. Many ways of providing output regarding the determined health of the wireless mesh network 100 may be, and in some embodiments are, implemented.

Figure 7:
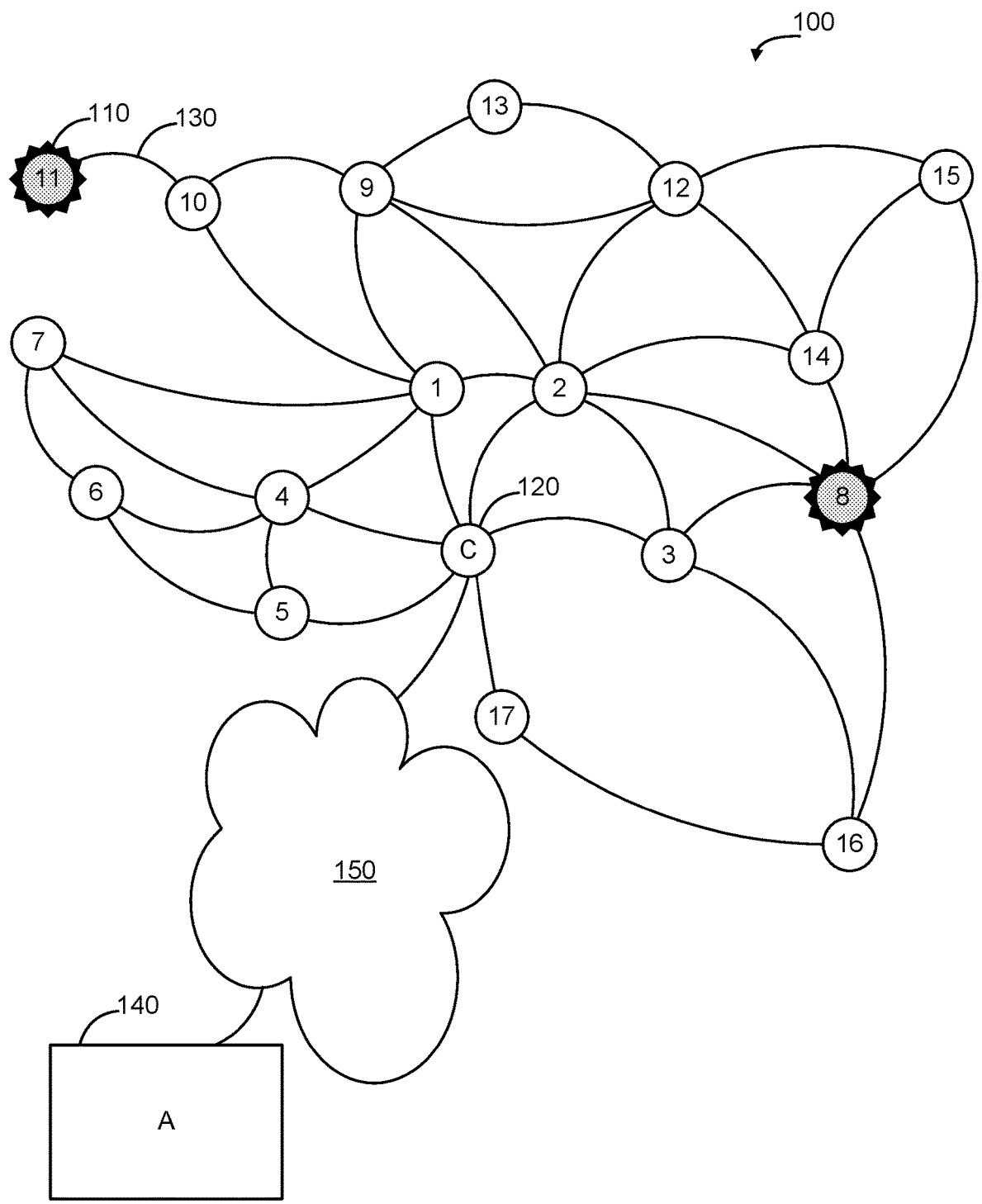
FIG. 7 is a graphical representation of the output of the health determination process showing the network health of a wireless mesh network according to embodiments disclosed herein.

FIG. 7 shows an example output from the network health determination process 500-2 of FIG. 5 identifying two areas of the wireless mesh network 100 where the dependency exceeds the reliability, which might indicate possible areas of the network that could be problematic at a future point in time. As shown in FIG. 7, a radio node 11 has been highlighted as a single point of failure since it has no reliability, e.g. the radio node 11 is only connected to the other lower ranked radio nodes via a single link 130 and, as such, failure of the single link 130 between an adjacent radio node 10 and the radio node 11, or failure of the adjacent radio node 10, would render the radio node 11 unreachable on the wireless mesh network 100.

A radio node 8 has been highlighted as well, since it has a dependency of three, indicating that three other nodes depend on it, while it has a reliability of two, meaning that it only has only two paths to lower ranked nodes. This indicates that multiple other radio nodes depend on the radio node 8, while the radio node 8 only has limited reliability and, hence, a failure in that region of the wireless mesh network 100 is both more likely and, if a failure were to occur, the failure would affect a larger number of other radio nodes and potentially routes through the wireless mesh network 100.

Endpoint devices connect to the radio nodes 110 of the wireless mesh network. In some embodiments, the radio nodes 110 maintain a list of endpoint devices that are visible to the radio node. For example, in some embodiments, endpoint devices will periodically transmit a proximity check message to detect whether the endpoint device is within communication distance of any radio node 110. In some embodiments, all radio nodes 110 that receive a proximity check message from an endpoint device will record the node ID of the endpoint device and include the list of visible endpoint devices in their proximity tables. The aggregator 140 will collect the list of visible endpoint devices and determine, from the lists of visible endpoint devices, which endpoint devices are visible to only one radio node 110 and which endpoint devices are visible to more than one radio node 110. Devices that are visible to only one radio node 110 on the wireless mesh network 100 may be, and in some embodiments are, identified as potential points of failure on the wireless mesh network 100, since they have only one potential parent on the wireless mesh network 100. This enables the network health determination process 500-2 to determine whether endpoint devices have potential redundant paths through multiple potential parent radio nodes.

Application of the network health determination process 500-2 to an example ZigBee wireless mesh network will now be described. In this example, the ZigBee wireless mesh network includes a coordinator, a plurality of routers, and end devices (not shown). The coordinator forms the wireless mesh network and performs routing. Routers join the wireless mesh network and perform routing. End devices join the wireless mesh network, do not partake in routing, communicate only with a parent router (a selected one of the routers or coordinator), and usually have their RF transceiver turned off between check in periods. In the example ZigBee network, the coordinator also functions as the aggregator 140. The ZigBee network includes a large number of low memory distributed devices that report sensor information to the coordinator. Each radio node will have eight to sixteen entries in its neighbor and routing tables 210, and will have thirty-two to sixty-four entries in its proximity table 250. ZigBee routers and the coordinator function as routers in the ZigBee network, and thus are the devices that will fully participate in the link quantification process. ZigBee end devices whose receivers remain off for the majority of the time do not maintain a proximity table or participate in the link quantification process, however they periodically issue a proximity check message once an hour. The complete link quantification process is initiated within a given time period, for example but not limited to twenty-four hours of a significant network change, while a localized link quantification process is performed more frequently. For example, a significant network change may include the addition and removal of more than five percent of the radio nodes in the network. In some embodiments, for example, in a network with one hundred radio nodes, replacing three radio nodes (removal of three percent+addition of three percent) would constitute a significant network change.

The coordinator is responsible for detecting significant changes in the network and for detecting periods of low network activity. When a significant network change is detected, the coordinator initiates the link quantification process for each radio node in turn, thus it controls the progression of the link quantification process. When there are lulls in network activity, the coordinator will allow the radio nodes to periodically self-initiate the link quantification process. For example, in the middle of the night there will be very low activity on a lighting control network, thus the coordinator will allow radio nodes to perform network diagnostics such as link quantification during this time.

A radio node that is scheduled to self-initiate a link quantification process will delay the operation by at least ten seconds if it detects a link quantification message being transmitted by another radio node. Each radio node that participates in the link quantification process will issue, for example, twenty to two hundred link quantification messages through interPAN at each of five transmit power level settings. The first set of link quantification messages will be sent out at full transmit power, and each subsequent set of link quantification messages will have the transmit power reduced by six dB. The transit power is adjusted by the PHY to cause the RF transceiver to transmit link quantification messages at the desired power levels, and then the PHY resets the power level to maximum power upon the completion of the transmission of the link quantification messages. This ensures that the reduced power has limited impact on other networking operations. Each link quantification message is sent out at an interval of five hundred to fifteen hundred milliseconds, such that the link quantification process for a single radio node should be completed in less than five minutes. If all radio nodes sequentially perform the link quantification process during unique time intervals (if the radio nodes perform link quantification one at a time), a wireless mesh network with one hundred radio nodes may take up to nine hours to fully quantify the edges. In some embodiments, once the aggregator has knowledge of the network, the aggregator may instruct radio nodes in different areas of the network to perform link quantification processes simultaneously to reduce the overall time required to fully quantify the edges.

Radio nodes that receive the link quantification messages with a sequence number of 0 from a remote radio node add or update an entry in the local proximity table, which includes the transmitting radio node ID, received signal strength indicator, lowest acceptable transmit power level, current transmit power level, message count at the current transmit power level, and the age of the entry. The proximity table keeps track of the average received signal strength indicator for messages that were transmitted at full power, and it tracks the lowest transmit power level for which the radio node has received all messages (0% PER).

The aggregator (instantiated in coordinator in this example ZigBee network) queries each radio node for link quantification information from the radio node's proximity table. The link quantification information may be, and in some embodiments is, retrieved upon the completion of the full link quantification process, and periodically while devices are self-initiating localized link quantification processes. Once a radio node transmits a portion of the proximity table information to the aggregator, the corresponding entries are deleted from the proximity table on that radio node, which frees up space in the proximity table for other entries related to other radio nodes on the wireless mesh network. Over multiple iterations, causing entries to be deleted from the proximity table allows the sixty-four entries in the proximity table to report information on a larger set of radio nodes.

ZigBee endpoint devices are generally radio silent for longer intervals and they communicate through a single parent even though they are within range of a number of potential parents. The endpoint device will readily search for a new parent if a message is not acknowledged, however the inherent ZigBee structure makes it difficult to determine whether an endpoint device has potential redundant paths through other parents. Endpoint devices send out a proximity check interPAN message once an hour. Radio nodes that receive this message add the corresponding endpoint device radio node ID to the proximity table, as well as include the received signal strength indicator, and specify that the entry is associated with an endpoint device rather than another radio node.

Once the proximity table information is relayed to the aggregator, the redundancy for the endpoint device is determined by looking for edges connecting the endpoint device to radio nodes. To implement this, table entries for endpoint devices are separated and the number of potential parents, defined as the number of unique endpoint device proximity table entries for each endpoint device are calculated. Proximity table information for radio nodes are compiled into an N×N interconnect matrix, where the row and columns are the radio nodes in the network, and the entries are the directed link quality from the column radio node to the row radio node. Each entry is a zero if there is no link between the radio nodes, if the average received signal strength indication is <−75 decibel milliwatts (dBm), or if the lowest acceptable power reduction is <six dB, i.e. the link quantification information indicates that a power reduction of six dB or less generated measurable packet error rate. Otherwise, the entry is deemed a reliable link and the value of link is set as the lowest acceptable power reduction, as derived from the link quantification information. Once the intercommunication matrix has been updated by the link assessment process, the rank of each radio node is reset, and a new rank is calculated based on the information contained in the intercommunication matrix. The coordinator is assigned the rank of 0, and every radio node that communicates directly with the coordinator is initially assigned the rank of 1'. The rank 1' radio nodes are then reassessed such that if a rank 1' radio node has an edge with at least one other rank 1 or 1' radio node, then it is assigned the rank 1 with the reliability factor equal to the number of the edges. If the rank 1' radio node does not have at least one more edge, then it returns to being unranked. Unranked radio nodes will then be assessed by the number of edges that it has with rank 0 and rank 1 radio nodes. If the number of edges exceeds two, then the radio node is rank 2 with a reliability equal to the number of edges. This process is repeated until a rank is empty i.e. no radio nodes were ranked during an iteration. Any radio nodes that remain unranked are flagged as having a single point of failure.

Upon completion of the ranking, the reliability and dependency of each radio node is evaluated. A radio node with a dependency of 0 is an outlying radio node that is expected to have little pass-through traffic. The effect of noise transients on these radio nodes will have minor impact on the network. A radio node with a high reliability and high dependency is a high traffic radio node that is expected to have high pass-through traffic. Noise transients around these devices may have a big impact on the performance of the wireless mesh network. A radio node with a dependency that is significantly higher than the reliability is a feeder radio node, and it has the potential of being a single point of failure if a noise transient significantly degrades the upstream links to the coordinator.

The coordinator is a single point of failure since it is the focal point for traffic flowing into and out of the wireless mesh network. Most of the radio nodes that communicate directly with coordinator are considered rank 1 radio nodes, however in the example network shown in FIG. 1, a radio node 17 is rank 4 even though it is directly connected to the coordinator C, since its second independent route must pass through a rank 3 radio node (a radio node 16). In FIG. 1, a radio node 11 has a single point of failure, thus it is flagged as an unreliable radio node. Radio nodes 1 and 2 have the highest dependency and reliability, thus these radio nodes are expected to have the highest traffic throughput and must be evaluated more often to detect changes in network health.

Interference and noise sources may be band limited, and they may be dependent on the wavelength, thus noise floors and multipath losses will vary depending on the chosen communication channel frequency. Performing the link quantification process and radio node ranking on multiple channels enables the system to identify which channel is the most conducive for network health.

Endpoint devices that appear to have at most one parent may likewise be identified to determine a lack of redundancy at the edge of the wireless mesh network 100.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, flash memory, solid state drive, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), personal area network (PAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), tablet(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method, comprising:
    determining a bandwidth evaluation of a wireless mesh network;
    in response to determining the bandwidth evaluation, determining at least one channel frequency to communicate a first set of link quantification messages in the wireless mesh network;
    receiving, by a receiving radio node in the wireless mesh network, a first set of link quantification messages that were transmitted at a maximum transmit power level by a transmitting radio node in the wireless mesh network;
    receiving, by the receiving radio node in the wireless mesh network, at least portions of subsequent sets of link quantification messages that were transmitted at lower power levels below the maximum transmit power level by the transmitting radio node in the wireless mesh network;
    detecting, by the receiving radio node from the subsequent sets of link quantification messages, one of the lower power levels at which the receiving radio node experiences measurable packet error rate;
    storing the power level at which the receiving radio node experiences measurable packet error rate as an indication of noise on a link between the receiving node and the transmitting node;
    based on the at least one channel frequency, validating the indication of noise on the link between the receiving node and the transmitting node; and
    receiving subsequent sets of link quantification messages in which each subsequent set of link quantification messages was transmitted at a unique discrete lower power level.

2. The method of claim 1, wherein storing the power level at which the receiving radio node experiences measurable packet error rate comprises:
    storing the power level at which the receiving radio node experiences measurable packet error rate as an indication of transient noise on the link between the receiving node and the transmitting node.

3. The method of claim 1, further comprising:
calculating an approximation of a signal to noise ratio for the link between the receiving node and the transmitting node using the maximum transmit power level and the power level at which the receiving radio node experiences measurable packet error rate.

4. The method of claim 1, further comprising:
determining, from the first set of link quantification messages, a received signal strength indication for the link between the receiving node and the transmitting node to quantify a noise level for the link between the receiving node and the transmitting node.

5. The method of claim 4, wherein determining the received signal strength indication comprises:
calculating individual received signal strength indications for each of the messages of the first set of link quantification messages; and
determining an average received signal strength indication from the calculated individual received signal strength indications.

6. The method of claim 4, further comprising:
transmitting link quantification information to an aggregator, the link quantification information comprising a node identifier of the transmitting radio node, a node identifier of the receiving radio node, the determined received signal strength indication for the link between the receiving node and the transmitting node, and the lower power level at which the receiving radio node experiences measurable packet error rate for the link between the receiving node and the transmitting node.

7. The method of claim 1, wherein detecting one of the lower power levels at which the receiving radio node experiences measurable packet error rate comprises:
determining, by the receiving radio node, that one or more link quantification messages of one of the sets of link quantification messages was not received; and
associating a transmit power level of the one of the sets of link quantification messages as the lower power level at which the receiving radio node experiences measurable packet error rate.

8. The method of claim 1, further comprising:
receiving, by the receiving radio node, proximity check messages from endpoint devices; and
storing endpoint device identifiers.

9. The method of claim 8, further comprising:
transmitting the endpoint device identifiers to an aggregator.

* * * * *